Patented Oct. 12, 1954

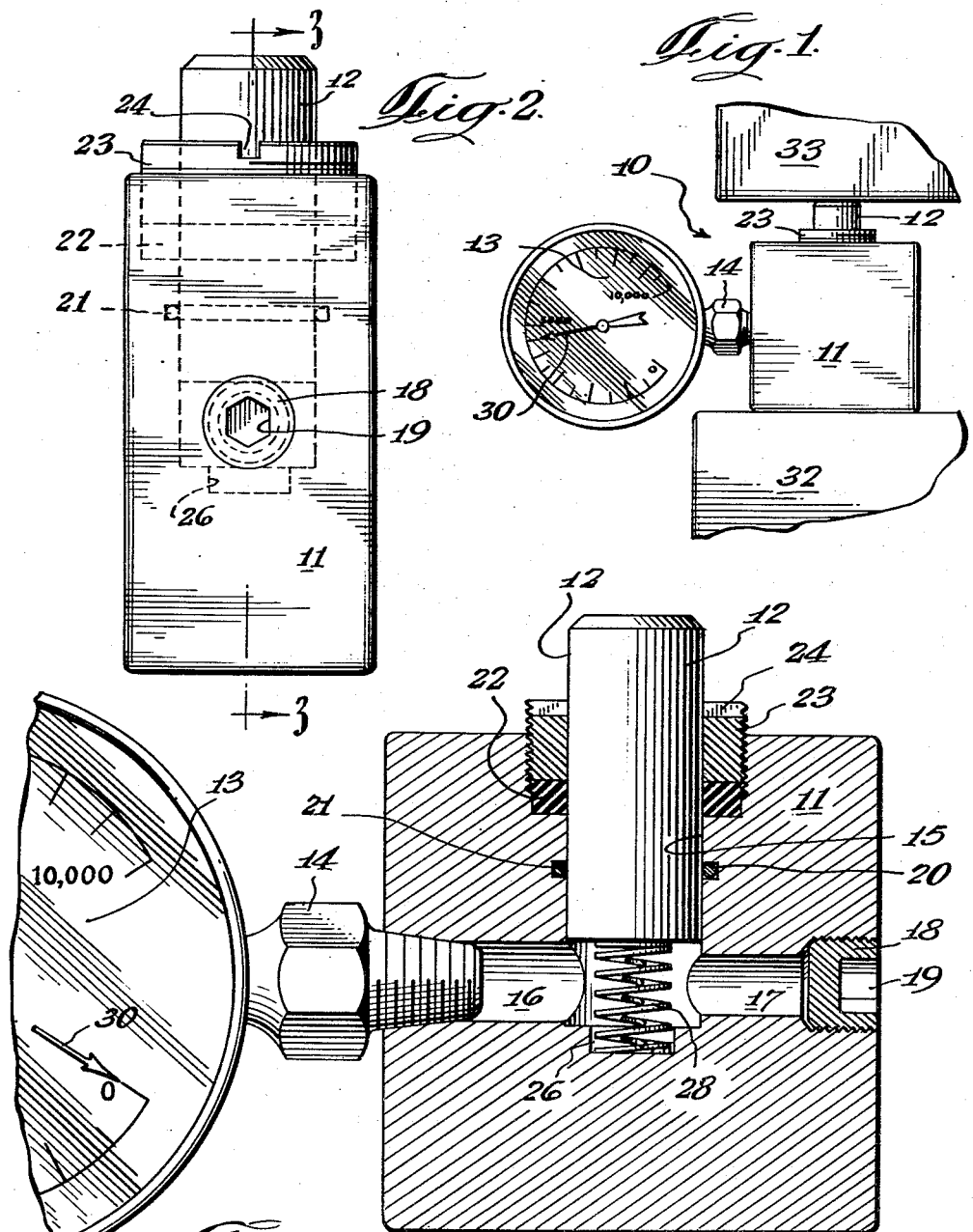

2,691,301

UNITED STATES PATENT OFFICE 2,691,301

DIRECT READING HYDRAULIC FORCE MEASURING DEVICE

Ward E. Guest, Maywood, Ill.

Application June 30, 1952, Serial No. 296,424

1 Claim. (Cl. 73—141)

This invention relates generally to a hydraulic pressure testing device and more particularly is concerned with the construction of the hydraulic testing device which utilizes a simple Bourdon tube indicating device which will read directly total pressure applied by a hydraulic machine.

Heretofore it has been necessary in determining the capacity of a hydraulic press or the like to utilize expensive standard equipment which requires careful handling and complicated calculations in order to obtain desired information. Furthermore, said equipment has been complex in structure.

The principal object of this invention is to provide a simple direct reading testing device which is extremely small in size and economical to manufacture, which may be placed in a hydraulic press or the like, the press operated, and which will give an accurate reading of the total amount of pressure applied by the press.

Other objects of the invention reside in the particular construction of the device which enables the same to utilize a simple Bourdon tube indicator and which will remain accurate over continued use for a long period of time.

With the foregoing and other objects in view which will appear as the description proceeds, the invention consists of certain novel features of construction, arrangement and a combination of parts hereinafter fully described, illustrated in the accompanying drawings, and particularly pointed out in the appended claim, it being understood that various changes in the form, proportion, size and minor details of the structure may be made without departing from the spirit or sacrificing any of the advantages of the invention.

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understand and appreciated.

Referring to the drawings in which the same characters of reference are employed to indicate corresponding or similar parts throughout the several figures of the drawings:

Fig. 1 is an elevational view of the hydraulic testing device positioned in a press to measure the full pressure applied thereby.

Fig. 2 is an end-on elevational view of the device taken from the right hand side as viewed in Fig. 1.

Fig. 3 is a sectional view through the device along line 3—3 of Fig. 2 and in the direction indicated.

Referring now to the figures, reference character 10 designates generally the pressure testing device, same comprising a metal block 11, preferably case hardened, having a piston or ram 12 in the top thereof and a Bourdon tube hydraulic pressure meter 13 connected to the left hand side of the block by the pressure fitting 14 in a manner presently to be described. The construction of the meter 13 is conventional and hence same is not shown in detail and will not further be specified.

The ram 12 is adapted for reciprocal movement in a close-fitting cylindrical bore 15 which is provided in the block 11. The said bore communicates with a horizontally disposed passageway 16 to the left hand end of which the fitting 14 is connected. The right hand end of the passageway 16 extends through the block in a narrowed passageway 17, the end of which is screw-threaded to receive a plug 18 adapted to be removed or inserted by an appropriate tool, such as for example, a hexagonal socket wrench, the plug being provided with a suitable socket 19 for the reception of the wrench.

Intermediate the ends of the bore 15 there is provided a ring groove 20 within which is seated a piston ring 21 known as an O ring. At its upper end the bore 15 has a widened diameter for the accommodation of a packing ring 22 of any suitable material pressed into position by means of a gland end 23. The gland end 23 is provided with a groove 24 across its face and is screw threaded into the widened cavity at the upper end of the bore 15 so that a suitable spanner wrench may be used to drive the same member inward compressing packing member 22. The lower end of the bore 15 protrudes below the passageway 16 and is provided with a reduced diameter well 26. The well seats a recovery spring 28 which is fairly stiff in order to push the ram 12 upwardly as presently will be described.

The area of the ram 12 at its lower end is exactly equal to one square inch, and in the case of a perfectly circular ram the diameter of the ram will be approximately equal to 1.130 inches. When pressure is applied in any amount to the ram the hydraulic pressure will be immediately transmitted to the meter 13 and the Bourdon tube therein will distort. Since the meter is calibrated to read pounds per square inch the needle 30 will indicate directly the total force applied to the ram 12. Since Bourdon tubes have a tendency to retain strain slightly, when pressure is removed from the ram 12, the coil spring 28 will force the same upwardly thereby drawing the Bourdon tube back to its zero position.

The manner of using the device is believed obvious although in Fig. 1 the same is shown placed upon the bed 32 of a hydraulic press and the movable head 33 of the press is shown engaging upon the top of the ram 12.

The plug 18 is for filling the device with hydraulic fluid and it is understood that the entire bored-out volume is filled with such fluid although same is not illustrated. Such volume, includes passageway 16, well 26, passageway 17, the bottom end of the bore 15, the interior of the meter 13 and whatever spaces remain in the hole which contains the plug 18.

It is believed that my invention, its mode of construction and assembly, and many of its advantages should be readily understood from the foregoing without further description, and it should also be manifest that while a preferred embodiment of the invention has been shown and described for illustrative purposes, the specific details are nevertheless capable of wide variation within the purview of this invention as defined in the appended claim.

What is claimed and desired to be secured by Letters Patent of the United States is:

A direct reading hydraulic pressure indicating device adapted to be inserted between relatively moving parts of a pressure operated apparatus, which comprises, a block-like housing having a surface for engaging one of said moving parts, a piston in said housing reciprocably mounted in a close-fitting bore therein and having one end of said piston protruding outwardly from the housing directly opposite said surface, a chamber in the housing in connection with the bore, a pressure meter connected with said chamber and having a Bourdon tube operating its movement, said meter being constructed and calibrated to indicate pressure in force per unit area, said chamber and its connections with the meter being completely filled with hydraulic fluid, the cross section of the piston having unit area in the same measurement system as the calibration of the meter, a spring supporting seat in said chamber in coaxial alignment with said piston and a spring in said seat engaging the piston to bias same to move out of said bore, said spring being of such compressive strength as to offset the tendency of the Bourdon tube to be strained from zero position.

References Cited in the file of this patent

UNITED STATES PATENTS

| Number | Name | Date |
|---|---|---|
| 664,805 | Bosworth | Dec. 25, 1900 |
| 2,107,883 | Benedek | Feb. 8, 1938 |
| 2,187,345 | Dinzl | Jan. 16, 1940 |
| 2,443,049 | McVey | June 8, 1948 |